United States Patent
You et al.

(10) Patent No.: US 11,256,546 B2
(45) Date of Patent: Feb. 22, 2022

(54) METHODS, APPARATUSES AND COMPUTER READABLE MEDIUMS FOR NETWORK BASED MEDIA PROCESSING

(71) Applicant: Nokia Technologies OY, Espoo (FI)

(72) Inventors: Yu You, Kangasala (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 123 days.

(21) Appl. No.: 16/460,354

(22) Filed: Jul. 2, 2019

(65) Prior Publication Data

US 2021/0004273 A1   Jan. 7, 2021

(51) Int. Cl.
G06F 15/173 (2006.01)
G06F 9/50 (2006.01)
H04L 12/911 (2013.01)
G06F 9/48 (2006.01)
H04L 29/06 (2006.01)

(52) U.S. Cl.
CPC .......... *G06F 9/5027* (2013.01); *G06F 9/4881* (2013.01); *G06F 9/5038* (2013.01); *G06F 9/5066* (2013.01); *H04L 47/70* (2013.01); *H04L 65/4069* (2013.01)

(58) Field of Classification Search
CPC .... G06F 9/5027; G06F 9/5066; G06F 9/4881; G06F 9/5038; H04L 47/70; H04L 65/4069
See application file for complete search history.

(56) References Cited

U.S. PATENT DOCUMENTS

| | | | |
|---|---|---|---|
| 2014/0068560 A1* | 3/2014 | Eksten | G06F 9/5066 717/120 |
| 2015/0244558 A1* | 8/2015 | Tully | H04L 29/08882 709/201 |
| 2017/0063615 A1 | 3/2017 | Yang et al. | |
| 2019/0028691 A1* | 1/2019 | Hinds | H04L 65/4084 |
| 2019/0068504 A1 | 2/2019 | Thambidorai et al. | |

FOREIGN PATENT DOCUMENTS

| | | | | |
|---|---|---|---|---|
| WO | WO-2020012072 A1 * | 1/2020 | | H04N 5/2624 |
| WO | WO-2020/144396 A1 | 7/2020 | | |
| WO | WO-2020/188139 A1 | 9/2020 | | |
| WO | WO-2020/188140 A1 | 9/2020 | | |

OTHER PUBLICATIONS

International Search Report and Written Opinion dated Oct. 2, 2020 in International Application No. PCT/US2020/040663.

* cited by examiner

*Primary Examiner* — Richard G Keehn
(74) *Attorney, Agent, or Firm* — Harness, Dickey & Pierce, P.L.C.

(57) ABSTRACT

A network apparatus distributes a first plurality of tasks for processing first media content among at least a first slicing window and a second slicing window based on a connection map included in a workflow description from a network based media processing (NBMP) source. The first slicing window includes at least one first task from among the first plurality of tasks and the second slicing window includes at least one second task from among the first plurality of tasks. The network apparatus provisions the first media content to at least a first of the one or more media sinks by deploying the at least one first task to one or more first media processing entities, and deploying the at least one second task to one or more of the first media processing entities in response to receiving an indication that the at least one first task has been deployed successfully.

22 Claims, 6 Drawing Sheets

METHODS, APPARATUSES AND COMPUTER READABLE MEDIUMS FOR NETWORK BASED MEDIA PROCESSING

TECHNICAL FIELD

One or more example embodiments relate to network based media processing (NBMP).

BACKGROUND

Network based media processing (NBMP) allows service providers and end users to distribute media processing operations. NBMP provides a framework for distributed media and metadata processing, which may be performed in Information Technology (IT) and telecommunications cloud networks.

NBMP abstracts the underlying computing platform interactions to establish, load, instantiate and monitor the media processing entities (MPEs) that will execute/run the media processing tasks. A NBMP system may perform: uploading of media data to the network for processing; instantiating MPEs; configuring the MPEs for dynamic creation of media processing pipeline; and/or accessing the processed media data and the resulting metadata in a scalable fashion in real-time or in a deferred way. The MPEs may be controlled and operated by a workflow manager in a NBMP platform that includes computation resources for implementing the workflow manager and the MPEs.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

One or more example embodiments provide mechanisms to allow more flexible workflow execution modes and/or task scheduling.

One or more example embodiments provide mechanisms for "breakable" workflows and associated stepping execution modes. The "breakable" feature between tasks may provide multiple levels of meaning to the workflow lifecycle and data management. For example, "breakable" may refer to the separation of tasks into an allocated (or execution) state and a scheduled state. This allows for binding tasks at a later point, thereby providing greater flexibility to the workflow manager.

The "breakable" feature may be analogous to the step mode in debugging computer code. In debug mode, compilers run one step a time to trace what is executed and all the states of the code. In the context of network based media processing (NBMP), the workflow execution is not stopped, but run in the collaborative mode with other workflows.

At least one example embodiment provides a method for provisioning media content to one or more media sinks, the method comprising: distributing a first plurality of tasks for processing first media content among at least a first slicing window and a second slicing window based on a connection map included in a workflow description from a network based media processing (NBMP) source, the first slicing window including at least one first task from among the first plurality of tasks and the second slicing window including at least one second task from among the first plurality of tasks; and provisioning the first media content to at least a first of the one or more media sinks by deploying the at least one first task to one or more first media processing entities, and deploying the at least one second task to one or more of the first media processing entities in response to receiving an indication that the at least one first task has been deployed successfully.

At least one other example embodiment provides a non-transitory computer-readable medium storing computer-executable instructions that, when executed by at least one processor at network apparatus, cause the network apparatus to perform a method for provisioning media content to one or more media sinks, the method comprising: distributing a first plurality of tasks for processing first media content among at least a first slicing window and a second slicing window based on a connection map included in a workflow description from a network based media processing (NBMP) source, the first slicing window including at least one first task from among the first plurality of tasks and the second slicing window including at least one second task from among the first plurality of tasks; and provisioning the first media content to at least a first of the one or more media sinks by deploying the at least one first task to one or more first media processing entities, and deploying the at least one second task to one or more of the first media processing entities in response to receiving an indication that the at least one first task has been deployed successfully.

At least one other example embodiment provides a network apparatus comprising: at least one processor and at least one memory including computer program code. The at least one memory and the computer program code are configured to, with the at least one processor, cause the network apparatus to: distribute first plurality of tasks for processing first media content among at least a first slicing window and a second slicing window based on a connection map included in a workflow description from a network based media processing (NBMP) source, the first slicing window including at least one first task from among the first plurality of tasks and the second slicing window including at least one second task from among the first plurality of tasks; and provision the first media content to at least a first of one or more media sinks by deploying the at least one first task to one or more first media processing entities, and deploying the at least one second task to one or more of the first media processing entities in response to receiving an indication that the at least one first task has been deployed successfully.

At least one other example embodiment provides a network apparatus comprising: means for distributing first plurality of tasks for processing first media content among at least a first slicing window and a second slicing window based on a connection map included in a workflow description from a network based media processing (NBMP) source, the first slicing window including at least one first task from among the first plurality of tasks and the second slicing window including at least one second task from among the first plurality of tasks; and means for provisioning the first media content to at least a first of one or more media sinks. The means for provisioning includes means for deploying the at least one first task to one or more first media processing entities, and means for deploying the at least one second task to one or more of the first media processing entities in response to receiving an indication that the at least one first task has been deployed successfully.

According to at least some example embodiments, the connection map may include a flow control parameter indicating whether a respective pair of tasks among the first plurality of tasks must be included in a same slicing window;

and the distributing may distribute the respective pair of tasks based on the flow control parameter.

The flow control parameter may be a breakable parameter.

The flow control parameter for the respective pair of tasks may further include a shareable parameter indicating whether the respective pair of tasks must be deployed at a same media processing entity.

The workflow description may include an execution mode parameter indicating an execution mode for processing the first plurality of tasks.

The execution mode may be one of a streaming execution mode and a stepping execution mode.

The provisioning may further include scheduling the at least one first task and the at least one second task for deployment to one or more of the first media processing entities prior to deploying the at least one first task and prior to deploying the at least one second task.

The first plurality of tasks may form a workflow including at least two connected tasks.

The method according to at least some example embodiments may further include: distributing a second plurality of tasks for processing second media content among at least the first slicing window and the second slicing window, the first slicing window including at least one third task from among the second plurality of tasks and the second slicing window including at least one fourth task from among the second plurality of tasks; and provisioning the second media content to at least a second of the one or more media sinks by deploying the at least one third task to one or more second media processing entities, and deploying the at least one fourth task to one or more of the second media processing entities in response to receiving an indication that the at least one first task has been deployed successfully.

The first plurality of tasks may form a first workflow, the second plurality of tasks may form a second workflow, and the first workflow and the second workflow may be executed collaboratively and synchronized according to the first slicing window and the second slicing window.

The at least one memory and the computer program code may be configured to, with the at least one processor, cause the network apparatus to distribute the respective pair of tasks based on the flow control parameter.

The at least one memory and the computer program code may be configured to, with the at least one processor, cause the network apparatus to schedule the at least one first task and the at least one second task for deployment to one or more of the first media processing entities prior to deploying the at least one first task and prior to deploying the at least one second task.

The at least one memory and the computer program code may be configured to, with the at least one processor, cause the network apparatus to: distribute a second plurality of tasks for processing second media content among at least the first slicing window and the second slicing window, the first slicing window including at least one third task from among the second plurality of tasks and the second slicing window including at least one fourth task from among the second plurality of tasks; and provision the second media content to at least a second of the one or more media sinks by deploying the at least one third task to one or more second media processing entities, and deploying the at least one fourth task to one or more of the second media processing entities in response to receiving an indication that the at least one first task has been deployed successfully.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Figure 1:
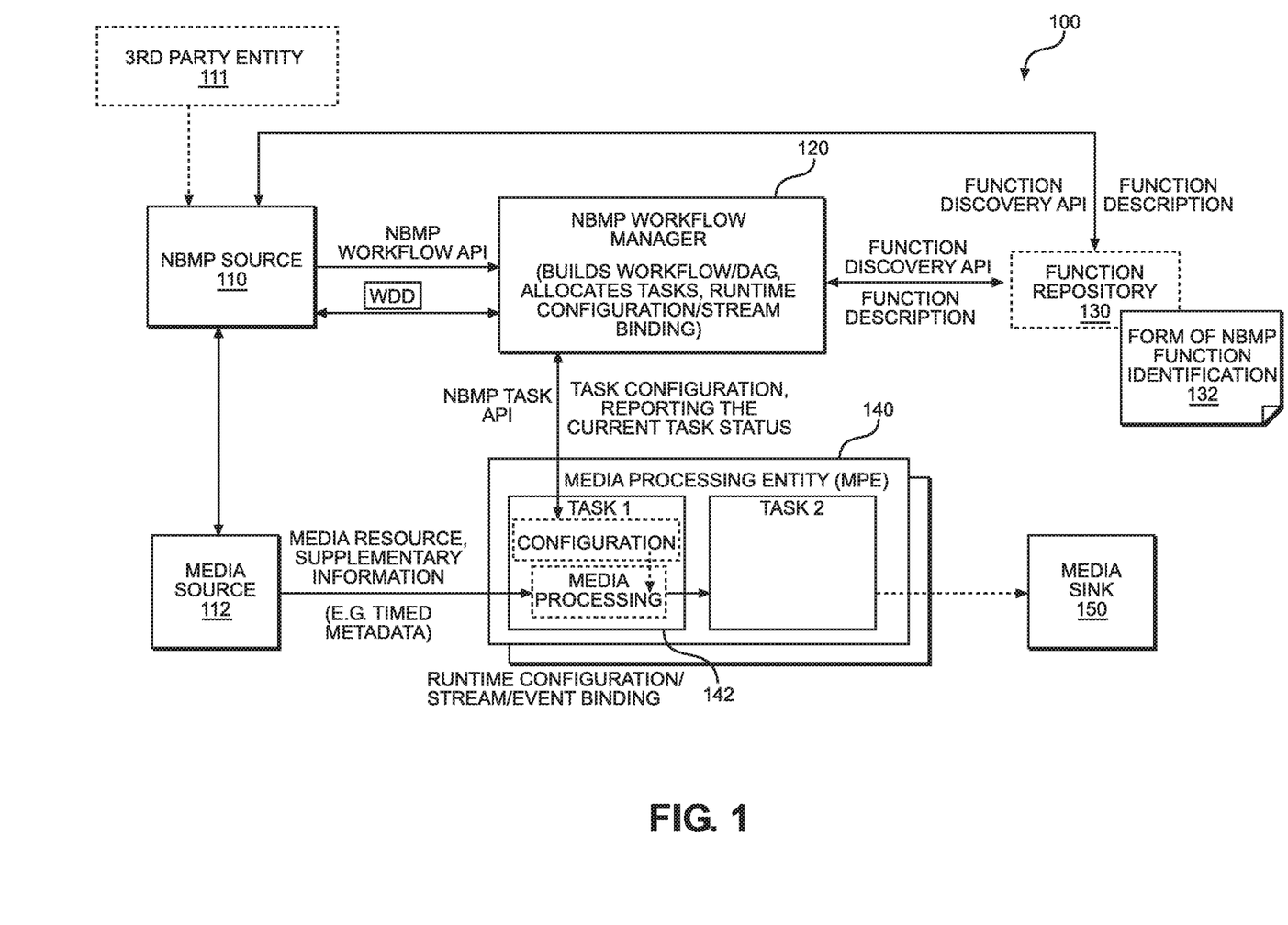
FIG. 1 illustrates a network based media processing (NBMP) system for implementing one or more example embodiments.

FIG. 1 illustrates a network based media processing (NBMP) system 100 for implementing one or more example embodiments. The NBMP system 100 is a system for media processing, which is performed across media processing entities (MPEs) in a network. Herein, media may also be referred to as media content, media data or multimedia content.

The system 100 includes, inter alia, a NBMP source 110, which is an entity that provides media content to be processed. The NBMP source 110 has a communicative connection to a workflow manager 120 and a function repository 130.

The NBMP source 110 triggers and describes media processing for the NBMP system 100 by a workflow description, which may be in the form of, and referred to as, a workflow description document (WDD). The workflow description describes the requested media processing and provides information about the nature and format of the associated media data. The NBMP source 110 may include, or be connected to, one or more media sources 112, such as one or more of a video camera, an encoder, a persistent storage, or the like. The NBMP source 110 may be controlled by a third-party entity 111, such as a user equipment (UE) or another type of entity or device providing, for example, one or more of feedback, metadata, network metrics, or the like, to the NBMP source 110.

The workflow manager 120 is an entity that orchestrates the network based media processing. The workflow manager 120 may also be referred to as a control function or NBMP control function. In the example embodiment shown in FIG. 1, the workflow manager 120 has a communicative connection with the NBMP source 110 and the function repository 130, and communicates with the underlying infrastructure (e.g., a cloud orchestrator (not shown)) to provision the execution environments such as containers, virtual machines (VMs), or physical computer hosts, which may thus operate as MPEs.

The workflow manager 120 receives the workflow description from the NBMP source 110 via a workflow Application Programming Interface (API) and builds a workflow (also referred to as a NBMP workflow) for requested media processing. The workflow description describes the information that enables the workflow.

The workflow manager 120 provisions tasks and connects the tasks to create a complete workflow based on the workflow description and function descriptions retrieved from the function repository 130. The workflow provides a chain of one or more task(s) to achieve a specific media processing. Chaining of task(s) can be sequential, parallel, or both at any level of the workflow. The workflow may be represented as a directed acyclic graph (DAG). Thus, a workflow may be understood as a connected graph of tasks (also referred to as media processing tasks), each of which performs a media processing operation for delivering media data and related metadata to be consumed by a media sink 150 or other tasks. A task (or media processing task) as discussed herein is a running instance of a network based media processing function that is executed by a MPE, such as MPE 140 in FIG. 1. A task included in a workflow transitions through different sets of states at different points in execution of the task.

The workflow manager 120 may be implemented with a dedicated server, may be virtualized, or may be implemented as a function in cloud computing environment. Hence, instead of one or more processors and one or more memories, the workflow manager 120 may include one or more processing functions and one or more memory functions for processing and storing data. On top of these functions, the workflow manager 120 may also include further functions such as a persistent storing function, a communication interface function, or the like. However, such functions are not illustrated for the sake of brevity and simplicity.

Still referring to FIG. 1, the function repository 130 is a network based function storing a plurality of function specifications 132 for use by the workflow manager 120 in defining tasks for a MPE 140. A function discovery API at the function repository 130 enables the workflow manager 120 and/or the NBMP source 110 to discover media processing functions that may be loaded as part of a workflow.

A MPE is an entity configured to perform one or more media processing tasks provisioned by the workflow manager 120. The MPE executes the tasks on media data and related metadata received from the NBMP source 110 via an NBMP task API or another MPE. As mentioned similarly above, the task(s) executed at the MPE produce media data and related metadata to be consumed by the media sink (also referred to as a media sink entity) 150 or other task(s) in another MPE.

The media sink 150 is generally a consumer of the output of a task of a MPE, such as MPE 140. The content processed by a task, such as task 142 in FIG. 1, may be sent in a NBMP publish format to the media sink 150 through existing delivery methods with suitable media formats; for example, through download, Dynamic Adaptive Streaming over Hypertext Transfer Protocol (DASH), Moving Picture Experts Group (MPEG) Media Transport (MMT), or other means.

The function repository 130 includes NBMP functions. A NBMP function may be a standalone and self-contained media processing operation and the corresponding description of that operation. The NBMP function performs processing of the input media to generate output media or metadata. Non-limiting examples of such media processing include: content encoding, content decoding, content encryption, content conversion to high dynamic range (HDR), content trans-multiplexing of the container format, streaming manifest generation, frame-rate or aspect ratio conversion, content stitching, etc.

In one example, the MPE 140 may be a process or execution context (e.g., appropriate hardware (HW) acceleration) in a computer, and multiple MPEs may be defined in a single computer. In this case, communications between tasks across MPEs may occur through process-friendly protocols such as Inter-Process Communication (IPC).

In another example embodiment, the MPE 140 may be a dedicated apparatus, such as a server computer. In yet another example embodiment, the MPE 140 may be a function established for this purpose by the workflow manager 120 using, for example, a suitable virtualization platform or cloud computing. In these cases, communications between tasks may be carried out across MPEs using, for example, Internet Protocol (IP)-based protocols.

Still referring to FIG. 1, the NBMP system 100 may further include one or more stream bridges, optionally interfacing the media processing entity 140 with the media source 112 and a media sink 150, respectively.

One or more example embodiments provide mechanisms to allow more flexible workflow execution modes and/or task scheduling.

One or more example embodiments also provide support for more optimized resource utilization with at least the following factors:

Late or delayed allocation to utilize computing resources in different pricing levels; or shared resource allocation dynamically in peak times (with respect to different pricing models). For example, media processing requests/asks for hardware (HW)-acceleration such as a Graphics Processing Unit (GPU) becomes more common with machine/deep learning approaches (e.g., neural networks). MPEs with suitable GPU support are relatively expensive. However, not all tasks in the workflow require GPU-powered MPEs. One or more example embodiments utilize scheduling to allow for more economically efficient late task instantiation so that instantiation of GPU-MPEs may be scheduled at the appropriate time when the input data becomes available, but without pre-occupying those expensive resources during the entire life cycle of the workflow.

Peak workload demand with cloud bursting. Within a limited or controlled budget, the number of the workflows that can be deployed is limited. When the demand for computing capacity spikes, the resources for MPEs may run out and creation of a new workflow may fail (e.g., "out of resources" or other types of failures due to the cost limit). One or more example embodiments enable prioritization of workflow resource usage by increasing the capacity of upstreams relative to downstreams and re-scheduling or pre-scheduling flexibility to allow for handling of dynamic changes in resource requirements. For example, a workflow manager may automatically execute the workflow(s) in a stepping execution mode based on whether one or more connections between tasks (the edges of the workflow DAG) are designated as "breakable." By doing so, the workflow manager may change the execution mode of the workflow to the stepping execution mode, for example, when the total resources consumed exceed a threshold value (e.g., over 85% of memory/virtual CPU loads over some time). The workflow manager may enforce those deployed tasks from their states such as "Running" to "Scheduled" and release more resources for new workflow instances as needed.

Stream processing versus batch processing: One or more example embodiments allow for determining which processing mode is more suitable for a given workflow, and selecting the more suitable processing mode.

One or more example embodiments introduce the concept of workflow slicing window (also referred to herein as a slicing window or slice, or workflow partition). When generating a workflow, the workflow manager may group tasks together into (distribute tasks among) slicing windows, and the workflow may be executed in the order of the slicing windows, wherein the tasks in each respective slicing window are deployed and executed separately and sequentially such that tasks in one slicing window are completed before executing the tasks in the next slicing window. According to at least some example embodiments, a workflow may include zero, one, or multiple slicing windows, up to the maximum number of the tasks in the workflow. The notation of the slicing windows can be represented as shown below.

|Slicing Windows|<=Length(Tasks)

Figure 2:
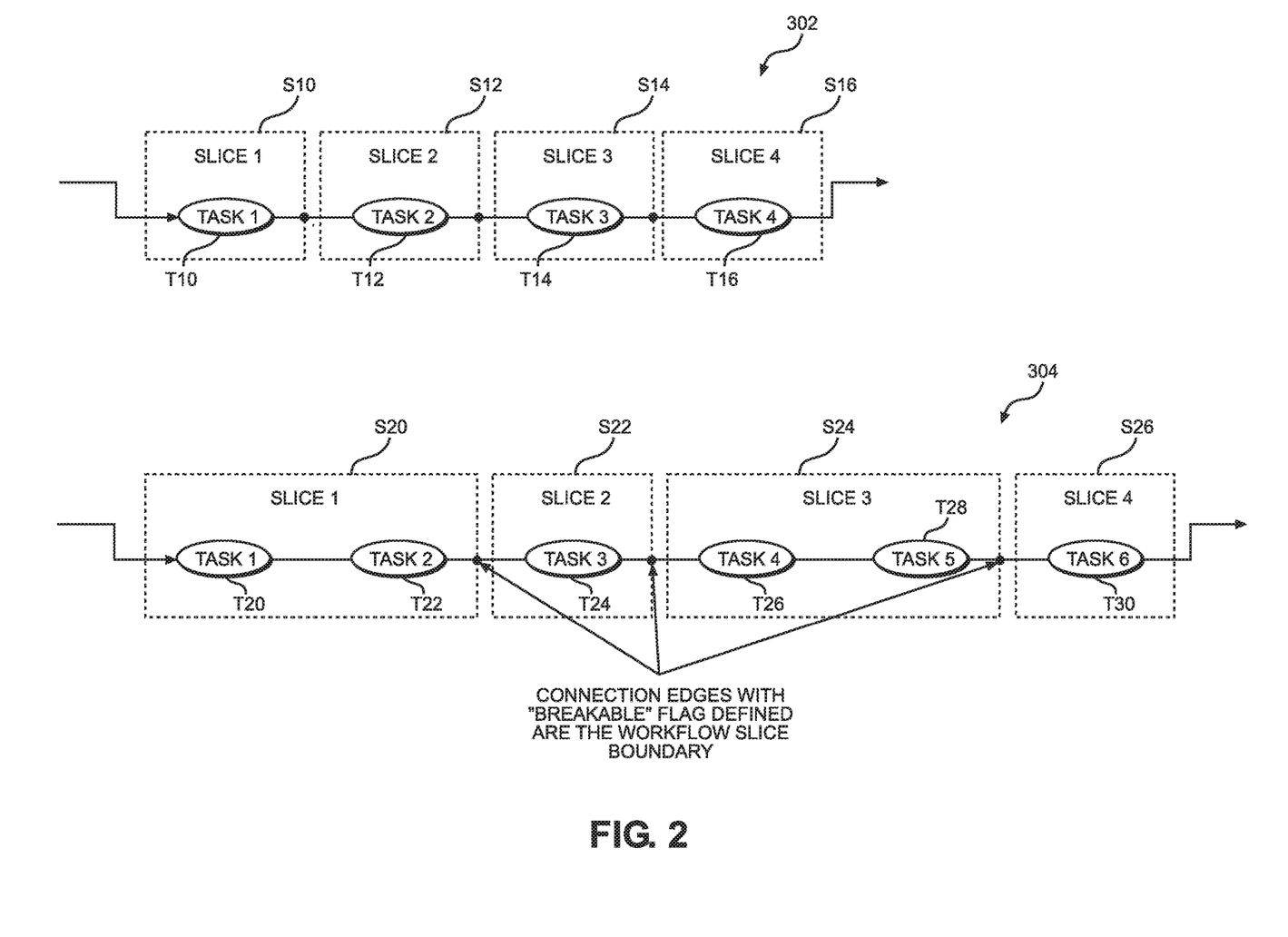
FIG. 2 shows two different slicing window configurations according to one or more example embodiments.

FIG. 2 shows two different slicing window configurations according to one or more example embodiments. Although only four slicing windows are shown in each configuration, example embodiments should not be limited to these examples.

Referring to FIG. 2, the slicing window configuration 302 includes four slicing windows S10, S12, S14 and S16, each including one task such that the number of slicing windows is the same as the number of tasks. Specifically, slicing window S10 includes task T10, slicing window S12 includes task T12, slicing window S14 includes task T14, and slicing window S16 includes task T16.

The slicing window configuration 304 includes four slicing windows S20, S22, S24 and S26 for six tasks T20, T22, T24, T26, T28 and T30. As shown, the slicing window S20 includes tasks T20 and T22, slicing window S22 includes task T24, slicing window S24 includes tasks T26 and T28 and slicing window S26 includes task T30.

According to one or more example embodiments, the workflow manager may group all slicing windows from multiple workflows with the same identifier together and synchronize the executions of the tasks in each slicing window. Tasks in a next slicing window are deployed and executed only after completion of tasks in the previous slicing window.

Figure 3:
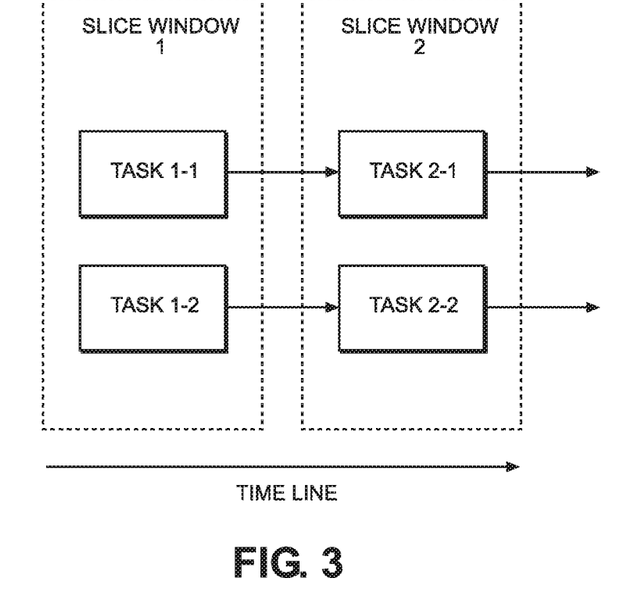
FIG. 3 shows a slicing window configuration according to one or more other example embodiments.

FIG. 3 is a diagram illustrating a slicing window configuration in which multi-workflow execution is synchronized. As shown in FIG. 3, the first task Task1-1 from a first workflow and the first task Task1-2 of a second workflow are grouped into a first slicing window, thereby synchronizing the execution of these tasks. Similarly, a second task Task2-1 from the first workflow and the second task Task2-2 from the second workflow may be grouped into a second slicing window to synchronize the execution of these tasks across workflows.

In at least one other example embodiment, the slicing windows may be used by the workflow manager to schedule computing resources (e.g., the MPEs). In this example, tasks in a next slicing window are scheduled, and then deployed and executed only after completion of tasks in the previous slicing window.

The slicing windows may be defined explicitly in the workflow description from the NBMP source, wherein the edges of the DAG define the slicing window identifier. Thus, the slicing windows may be defined by the NBMP source, the workflow description provider. This mode may be referred to as the "manual mode." Consequently, a "manual mode" slicing window based execution may occur each time a workflow is executed.

In at least one other example embodiment, the workflow manager 120 determines whether to apply slicing windows at runtime based on, for example, the overall load of the platform and/or availability of the computing resources. This mode may be referred to as "automatic mode." In this example, the workflow description specifies whether an edge of a pair of tasks is breakable, rather than defining slicing windows.

Figure 4:
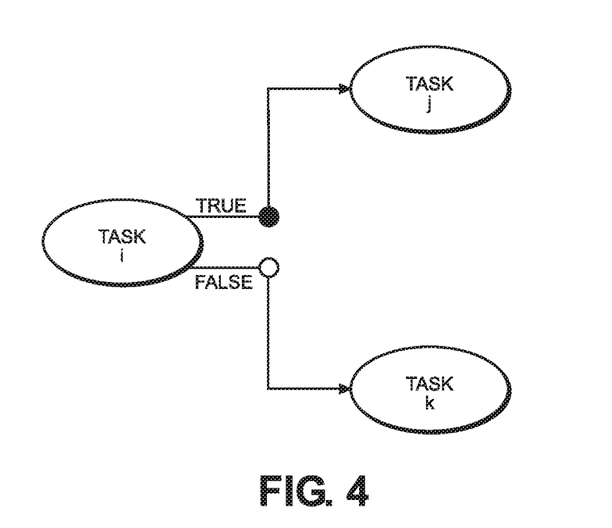
FIG. 4 illustrates a property defined in the edges of tasks according to one or more example embodiments.

FIG. 4 illustrates the property defined in edges of pairs of tasks according to one or more example embodiments.

Referring to FIG. 4, the same output from task i may be configured differently to a next task j and a next task k, respectively. For example, the data transmission between task i and task k may be near real-time, whereas the transmission from task i to task j may not be absolutely necessary, and the data may be cached accordingly by the nature of the data type using an appropriate protocol supported by the platform. In the automatic mode, the tasks i and j are designated as breakable, and may be split into separate slicing windows as needed, whereas tasks i and k are designated as not breakable and must be grouped into the same slicing window. The default value for breakable/unbreakable tasks may be "True" or "False."

The workflow description includes a Processing Descriptor (PD), which specifies a ConnectionMap object (also referred to as a connection map). The ConnectionMap object describes the connection edges of the DAG representation of the workflow. Table 1 below illustrates an example structure of a ConnectionMap according to one or more example embodiments. The information included in the ConnectionMap object may be referred to as connection information.

TABLE 1

| Name | Description | Type | Cardinality |
| --- | --- | --- | --- |
| from | specifies Task/Function's id and port names from which the connection is | Object | 1 |
| to | specifies Task/Function's id and port names to which the connection is | Object | 1 |
| flow_control parameters | contains flow control parameters for the connection | Object | 0-1 |
| other_parameters of connection | contains any other properties or parameters defined for the DAG edge, e.g. references to the Requirement Descriptor | Object | 0-1 |

Cardinality: 1 = exactly one, 0-1 = zero or one

According to one or more example embodiments, in addition to other conventional parameters, the "flow_control parameters" object in the ConnectionMap object includes at least the following parameters:
1) "breakable";
2) "shareable"; and
3) "slicing window identifier".

Each of the breakable and shareable parameters are Boolean, whereas the slicing window identifier is a string (e.g., a name) identifying the slicing window.

When the "breakable" parameter is False (e.g., '0'), the workflow manager must not allocate or distribute the tasks identified in the from and to fields separately (to different slicing windows). Rather, the workflow manager should include the tasks in the same slicing window such that the tasks are scheduled and instantiated at the same time (e.g., simultaneously or concurrently). The individual task placement or enhancement may be done as specified in the workflow description.

When the "breakable" parameter is True (e.g., '1'), the workflow manager may allocate or distribute the tasks in the from and to fields among different slicing windows as needed.

The "shareable" parameter indicates whether or not the tasks in the from and to fields of the ConnectionMap object must be deployed into a same MPE to ensure the minimal latency.

Example JSON schema for a ConnectionMap object according to one or more example embodiments is shown below.

```
{
  "$schema": "http://json-schema.org/draft-04/schema#",
  "type": "object",
  "properties": {
    "flow_control": {
      "type": "object",
      "properties": {
        "breakable": {
          "type": "boolean"
        },
        "shareable": {
          "type": "boolean"
        },
        "slicing window identifier": {
          "type": "string"
        }
      },
      "required": [
        "breakable",
        "shareable",
        "slicing window identifier"
      ]
    }
  },
  "required": [
    "flow_control"
  ]
}
```

The slicing window identifier is used to guide the synchronized execution of the workflow (e.g., as shown in FIG. 3).

Conventionally, the workflow execution mode for a workflow is a streaming execution mode, wherein all tasks in the workflow are scheduled, instantiated and waiting for data concurrently or simultaneously. In so doing, the total amount of resources for all tasks in the workflow are estimated and computing environments (MPEs) are requested and allocated from the cloud provider/infrastructure concurrently or simultaneously.

One or more example embodiments provide a stepping execution mode (also referred to as the stepping mode) that utilizes the above-discussed slicing windows. The stepping execution mode involves an incremental execution of the workflow in which tasks may be processed in batches according to slicing windows. A batch defines the quantity of tasks instantiated at one time, wherein the quantity of tasks may range from one to all tasks in the workflow.

According to one or more example embodiments, the stepping execution mode may take advantage of diverse processing delays and/or resource optimization and re-use.

When the stepping execution mode is enabled, tasks may have a "scheduled" state, and the workflow manager may support late task instantiation. Actual resource allocation may be requested and/or allocated in a delayed fashion at run-time (e.g., at the time when the input data is ready). The input data of a scheduled task may be any output of previous completed tasks. The workflow manager may be notified of completion of a task by the respective MPE having performed the task. The "scheduled" state of a task will be discussed in more detail below.

The workflow description may include a global variable to indicate that the workflow should be executed according to the stepping execution mode. More specifically, for example, an "execution_mode" parameter may be defined in the Requirements Descriptor of the workflow description under the "Workflow/task requirement." Table 2 shows an example set of Workflow/Task requirement parameters according to one or more example embodiments.

TABLE 2

| Name | Type | Cardinality |
| --- | --- | --- |
| execution_mode | String | 0-1 |
| function_fusible | P | 0-1 |
| function_enhancable | P | 0-1 |

Cardinality: 1 = exactly one, 0-1 = zero or one
Type: P = parameter,

Table 3 shows an example of a Requirements Descriptor including the Workflow/Task requirement parameters of Table 2 according to one or more example embodiments.

TABLE 3

| Parameter Name | Description | Data Type |
|---|---|---|
| QoS Requirements | Provides QoS requirements for the resource. | Object |
| Processing Requirements | Provides processing requirements for the resource. | Object |
| Security Requirements | Provides detailed security requirements during content ingestion and content distribution. | Object |
| Task/ Workflow requirements | function_fusible: Whether or not functions can be fused or splitted by NBMP Workflow Manager. When fused or enhanced, some system tasks may be added or dropped automatically and dynamically. function_enhancable: Whether or not the input and output of a task can be modified or enhanced with system-provided built-in functions such as media transcoding, media transport buffering for synchronization, or transporting media/metadata data between tasks/MPEs over networks execution_mode: Defines an execution mode for the workflow defined by the workflow description document. | Object |

Table 4 defines the requirements metadata, which are used as part of the Requirements Descriptor.

TABLE 4

| Name | Type | Unit | Description |
|---|---|---|---|
| Delay | number | millisecond | Provides delay requirements for the resource. For task: specifies the delay requirements for the task For workflow: specifies the end-to-end delay requirements for the workflow |
| Bitrate | number | Bits per second | Provides bitrate requirements for content ingestion and distribution Ingestion Bitrate Requirements: Provides bitrate requirements for content ingestion Distribution Bitrate Requirements: Provides bitrate requirements for content distribution |
| throughput | number | Bits per second | Provides throughput requirements for the resource |
| Vcpu | number | count | Number of vcpus to be reserved for the execution of a particular Task in the Workflow. |
| Vgpu | number | count | Number of vgpus to be reserved for the execution of a particular Task in the Workflow. |
| Ram | number | MB | Memory in MB to be reserved for the execution of a particular Task in the Workflow. |
| Disk | number | GB | Size of local disk to be used by the corresponding Task in the Workflow. |
| placement | integer | identifier | Provides an identifier of the geographical location of the data center in which the Task is to be executed. |
| TLS | boolean | flag | Indicates if TLS or DTLS are mandatory for the transport of media data throughout the workflow. |
| IPSEC | boolean | flag | Indicates if IPSec is mandatory to be used for the exchange of media data in the workflow. |

TABLE 4-continued

| Name | Type | Unit | Description |
|---|---|---|---|
| CENC | boolean | flag | Indicates if CENC is mandatory to be used for the exchange of media data in the workflow. |

The execution_mode parameter (Table 2) may be a string type parameter that defines an execution mode for a workflow. In at least one example embodiment, the execution modes may include a streaming execution mode or a stepping execution mode. However, the string type parameter may also be "reserved" for other execution modes. Although shown as a string, the execution_mode parameter may be a Boolean if there are only two modes available (e.g., streaming and stepping execution modes).

As mentioned above, according to one or more example embodiments, tasks may have a "scheduled" state in the stepping execution mode.

The current NBMP specification defines five task states: Instantiated, Idle, Running, Error, and Destroyed, wherein each state has its associated events from the workflow manager. In the stepping execution mode, however, some tasks may be scheduled and then instantiated later. Accordingly, one or more example embodiments provide the Scheduled state, which is defined to make the task available (e.g., creating and assigning a task identifier (ID), etc.), without actually counting the actual computing resources into the overall resource requirement of the workflow. The Scheduled state allows the workflow manager to schedule tasks from NBMP functions without actually allocating resources for the tasks, and then instantiate the scheduled tasks later.

In one example embodiment, the MPE on which the scheduled task shall be instantiated may be created at the time when the task is scheduled to run. In another example embodiment, the MPE on which the scheduled task shall be instantiated may be shared from previously completed task(s), if the computing resources for this shared MPE like virtual CPU, GPU, memory, storage etc. satisfy the needs/requirements of the scheduled task.

Figure 5:
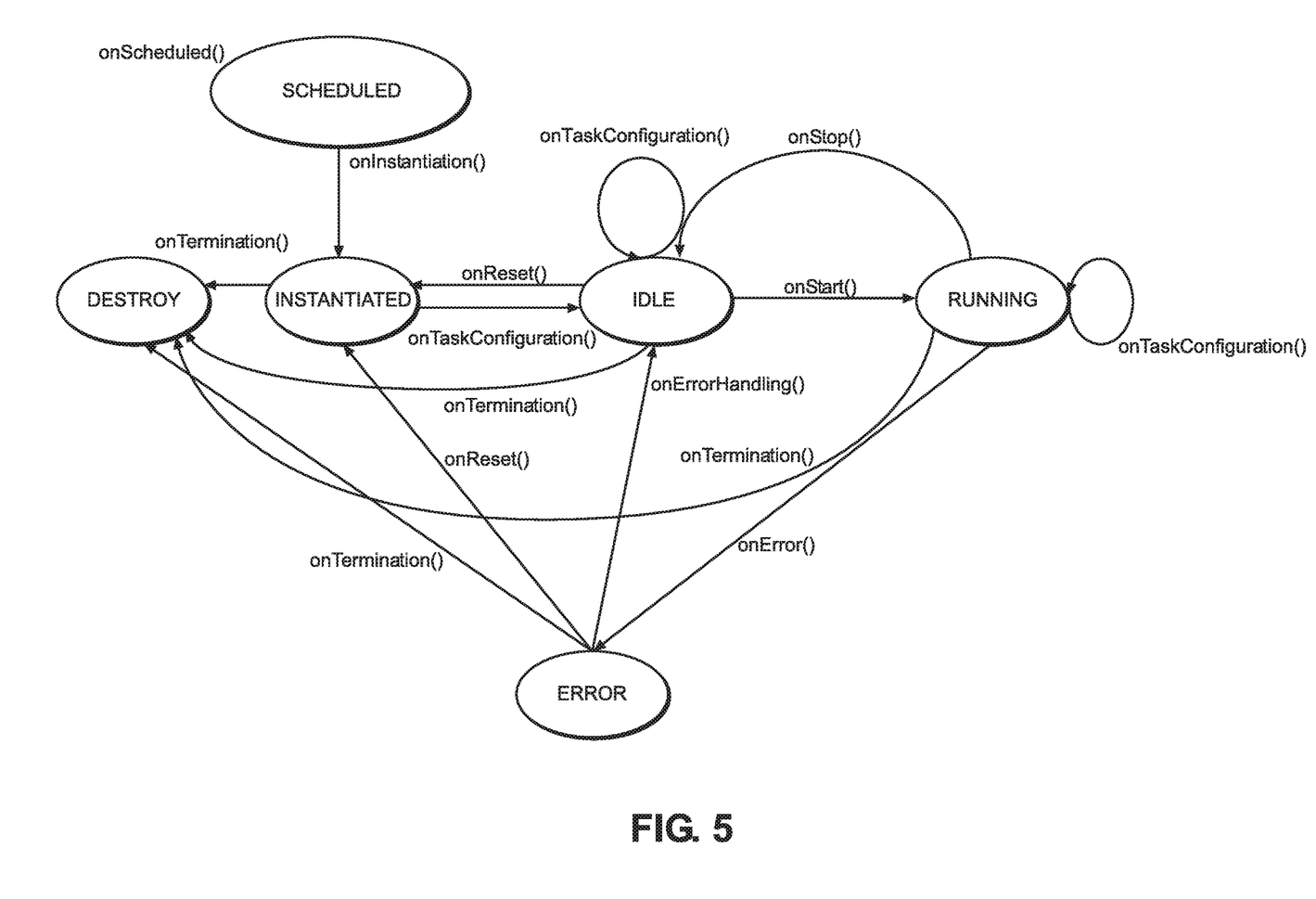
FIG. 5 is a state diagram illustrating a life cycle of a task according to one or more example embodiments.

FIG. 5 is a state diagram illustrating a life cycle of a task according to one or more example embodiments.

As shown in FIG. 5, the state diagram includes the "Scheduled" state as well as the Instantiated, Idle, Running, Error, and Destroyed states included in the current NBMP specification. Workflow states such as Instantiated and Running may support tasks which states are Scheduled. The Scheduled tasks have no effect on the workflow states.

Figure 6:
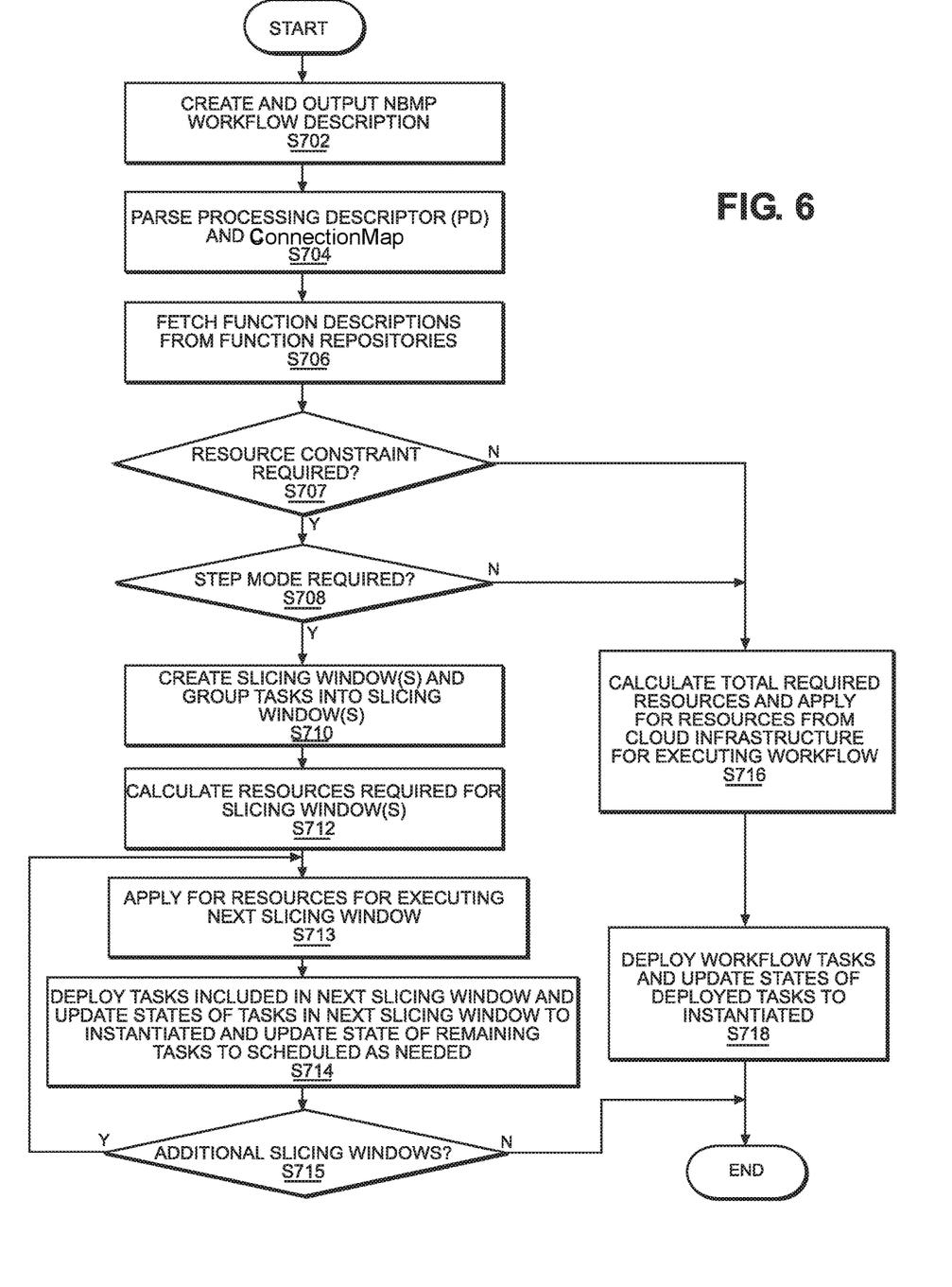
FIG. 6 is a flow chart illustrating a method according to one or more example embodiments.

FIG. 6 is a flow chart illustrating a method for executing a workflow according to one or more example embodiments. For example purposes, the method shown in FIG. 6 will be discussed with regard to the NBMP system 100 shown in FIG. 1. However, example embodiments should not be limited to this example.

Referring to FIG. 6, at step S702, the NBMP source 110 creates a NBMP workflow description and outputs the workflow description to the workflow manager 120.

At step S704, the workflow manager 120 parses the PD and ConnectionMap included in the workflow description from the NBMP source 110 to identify the relevant function descriptions for the workflow described in the workflow description.

At step S706, the workflow manager 120 retrieves the relevant function descriptions from the function repository 130 to generate the workflow.

At step S707, the workflow manager 120 determines whether a resource constraint is required for the workflow described by the workflow description from the NBMP source 110. In one example, the workflow manager 120 determines whether a resource constraint is required based on resource availability for executing the workflow in the cloud infrastructure. For example, if the resource availability is greater than or equal to a threshold level, a resource constraint may not be required. On the other hand, if the resource availability is less than the threshold level, then the workflow manager 120 may determine that a resource constraint is required. The threshold level may be set as needed by a network operator based on empirical data. According to at least one example embodiment, the workflow manager 120 may determine resource availability based on resource indications from the cloud infrastructure.

In more detail, for example, the workflow manager 120 may determine whether a resource constraint is needed based on available resources and/or cloud infrastructure response time (resource indications), which may indicate the paucity of resources, obtained from the cloud infrastructure (not shown) through an interface. In another example, the workflow manager 120 may be aware of the resources available in the cloud infrastructure at different access levels. For example, a particular set of GPU enabled MPEs may be available for level 1 access, whereas other GPU enabled MPEs may be available for a higher level, such as level 2. Consequently, depending on NBMP source "access level" or "access mode" such as ACL (access control list) or RBAC (role-based access control), the workflow resources that are available may change. In this case, the workflow manager 120 may determine whether a resource constraint is needed based on the resources available at an access level applicable to a particular workflow.

If the workflow manager 120 determines that a resource constraint is required at step S707, then at step S708 the workflow manager 120 determines whether the stepping execution mode is required based on the execution_mode parameter included in the Requirements Descriptor. As discussed above, the execution_mode parameter may indicate whether the workflow should be executed according to the stepping execution mode or the streaming execution mode. Accordingly, the workflow manager 120 determines whether the stepping execution mode is required based on the execution_mode parameter included in the Requirements Descriptor of the workflow description.

If the workflow manager 120 determines that stepping execution mode is necessary, then at step S710 the workflow manager 120 generates slicing windows based on break points specified in the ConnectionMap object. As mentioned above, break points in the ConnectionMap object may include pairs of tasks for which the "flow_control parameters" object includes a breakable parameter set as "True." Also at step S710, the workflow manager 120 schedules the tasks in each slicing window for execution by updating the state of the tasks to Scheduled. According to at least some other example embodiments, the workflow manager 120 may update states of tasks in (only) a subset (less than all) of the slicing windows to Scheduled. The number of slicing windows in the subset may be determined by the slicing window identifiers in the Table 1, or a network operator according to network conditions, the tasks included in the workflow, available resources, etc.

At step S712, the workflow manager 120 calculates the resources needed for the scheduled tasks included in one or more of the slicing windows generated at step S710. According to at least one example embodiment, the workflow manager 120 calculates the resources needed for scheduled tasks included in each slicing window based on the requirements metadata part of the Requirements Descriptor. The amount of computational resources required for tasks in a given slicing window may be based on whether a CPU and/or GPU is required, the amount of memory, media encoder availability (e.g., H.264 hardware accelerator codec enabled), inter-task connectivity linkages data rates, or the like, which may be indicated by the requirements metadata part of the Requirements Descriptor.

In at least one example embodiment, at step S712 the workflow manager 120 may calculate the resources needed for the scheduled tasks included in each slicing window on a per slicing window basis. That is, for example, the workflow manager 120 may separately calculate the resources required for the scheduled tasks in each respective slicing window. Calculating the required resources for a larger number of (e.g., all) slicing windows at step S712 may provide longer lead time to obtain the required resources and/or enable the workflow manager 120 to perform a higher level of optimization across the slicing windows.

At step S713, the workflow manager 120 applies for selected MPE(s) 140 (resources) from infrastructure provider(s) for executing the tasks included in the next (e.g., first) active slicing window. The number of MPEs and their capabilities may be based upon the calculated resources needed for the tasks within at least a next slicing window.

At step S714, the workflow manager 120 deploys the tasks in the active workflow slicing window to the selected MPE(s) 140 for execution. Although MPEs are selected, the actual placement of the tasks for execution may be carried out by a cloud orchestrator (not shown), which may reside in a cloud system platform (not shown). The one or more MPE(s) execute the task(s) to provide media to the media sink 150.

Also at step S714, the workflow manager 120 updates the state of the deployed tasks in the current slicing window to Instantiated in response to receiving confirmation from the MPE(s) 140 that the task has been deployed and/or executed successfully. The tasks in the subsequent workflow slicing windows (to be executed later) are maintained in the Scheduled state. According to at least some example embodiments, if tasks in only a subset of the slicing windows are currently set in the Scheduled state, then the workflow manager 120 may also update states of one or more next slicing windows to the Scheduled state as needed.

At S715, the workflow manager 120 determines whether the workflow includes additional slicing windows (e.g., whether the current slicing window is the only or last slicing window in the workflow).

If the workflow includes additional slicing windows, then the process returns to step S713, and continues as discussed herein for the next slicing window.

Returning to step S715, if the workflow does not include additional slicing windows, then the workflow manager 120 determines that execution of the workflow is complete.

Returning to step S708, if the stepping execution mode is not required, then the workflow manager 120 determines that the workflow should be executed according to the streaming execution mode. In this case, at step S716 the workflow manager 120 calculates the resources required for execution of all tasks in the workflow and applies for selected MPE(s) 140 (resources) from infrastructure provider(s) for executing the tasks in the workflow. The workflow manager 120 may calculate required resources and apply for selected MPE(s) 140 at step S716 in the same or substantially the same manner as discussed above with regard to steps S712 and S713, except that the calculating and applying is performed for all tasks in the workflow, rather than only tasks in a given slicing window.

At step S718, the workflow manager 120 deploys the tasks in the workflow to the selected MPE(s) 140 for execution in the same or substantially the same manner as with step S714. Moreover, as with step S714, the actual placement of the tasks for execution may be carried out by a cloud orchestrator (not shown), which may reside in a cloud system platform (not shown). The one or more MPE(s) execute the task(s) to provide media to the media sink 150.

Also at step S718, the workflow manager 120 updates the state of the deployed tasks in the current slicing window to Instantiated in response to receiving confirmation from the MPE(s) 140 that the task has been deployed and/or executed successfully.

Returning to step S707, if the workflow manager 120 determines that a resource constraint is not required for the workflow, then the process proceeds to step S716 and continues as discussed above.

The example embodiment shown in FIG. 6 is an example of the automatic mode in which the workflow manager determines whether, and how, to apply slicing windows at runtime. In the manual mode, a similar method may be executed, except that steps S707, S708, S716 and S718 may be omitted and the method may proceed from step S706 directly to step S710 in the flow shown in FIG. 6.

In an alternative example embodiment, at step S708 in FIG. 6 the workflow manager 120 may determine whether the workflow should be executed according to the stepping execution mode based on whether one or more connections between tasks (the edges of the workflow DAG) are defined as "breakable" in the "flow_control parameters" object in the ConnectionMap object, rather than based on the execution_mode parameter. Additionally, in this example embodiment, step S707 may be omitted.

According to one or more example embodiments, the proposed "breakable" property between tasks may allow the workflow manager to enforce the workflow(s) into the stepping execution mode automatically. By doing so, the workflow manager 120 may change the execution mode of the workflow to the stepping execution mode, for example, when the total resources consumed exceed a threshold value (e.g., over 85% of memory/virtual CPU loads over some time). The workflow manager may enforce those deployed tasks from their states such as "Running" to "Scheduled" and release more resources for new workflow instances as needed.

Figure 7:
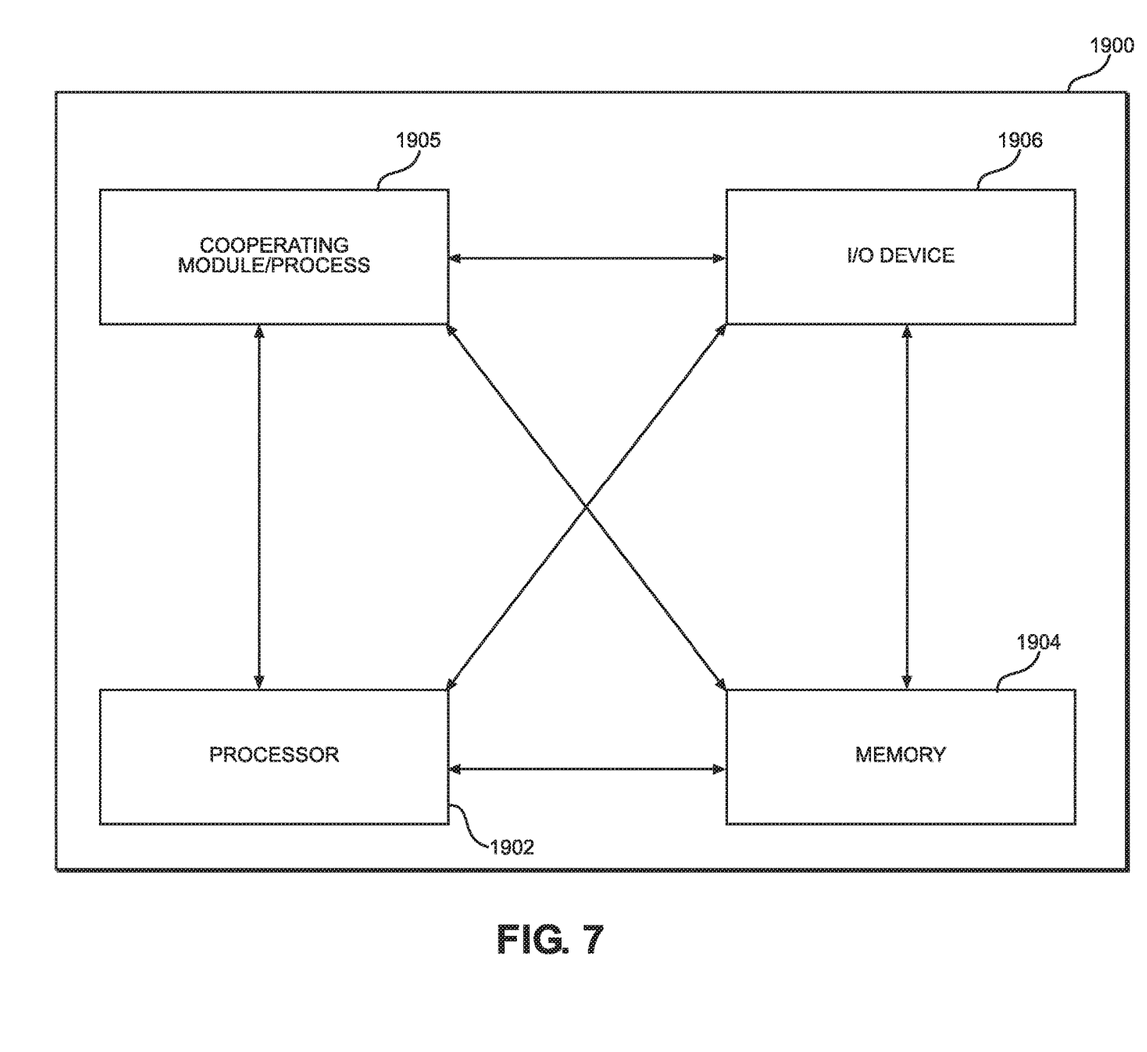
FIG. 7 depicts a high-level block diagram of a computer, computing or electronic device suitable for use in implementing, inter alia, network management devices, as well as other network elements and/or devices.

FIG. 7 depicts a high-level block diagram of a computer, computing or electronic device suitable for use in implementing, inter alia, workflow manager 120, MPE 140, media source 112, NBMP source 110, $3^{rd}$ party entity 111, media sink 150, function repository 130, other network elements and/or devices.

Referring to FIG. 7, the computer 1900 includes one or more processors 1902 (e.g., a central processing unit (CPU) or other suitable processor(s)) and a memory 1904 (e.g., random access memory (RAM), read only memory (ROM), and the like). The computer 1900 also may include a cooperating module/process 1905. The cooperating process 1905 may be loaded into memory 1904 and executed by the processor 1902 to implement functions as discussed herein and, thus, cooperating process 1905 (including associated data structures) may be stored on a computer readable storage medium (e.g., RAM memory, magnetic or optical drive or diskette, or the like).

The computer 1900 also may include one or more input/output devices 1906 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network elements or entities including workflow managers, data servers, network resource controllers, clients, routers, gateways, network nodes, computers, cloud-based servers, web servers, application servers, proxies or proxy servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Although example embodiments are discussed herein with regard to data servers, network devices may also include be network elements such as network resource controllers, clients, routers, gateways, network nodes, computers, cloud-based servers, web servers, application servers, proxies or proxy servers, or the like.

According to example embodiments, network elements, network devices, data servers, network resource controllers, clients, routers, gateways, network nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for provisioning media content to one or more media sinks, the method comprising:
distributing a first plurality of tasks for processing first media content among at least a first slicing window and a second slicing window based on a connection map included in a workflow description from a network based media processing (NBMP) source, the first slicing window including at least one first task from among the first plurality of tasks and the second slicing window including at least one second task from among the first plurality of tasks;
calculating resources needed for the first slicing window; and
provisioning the first media content to at least a first of the one or more media sinks by
deploying the at least one first task to one or more first media processing entities based on the calculated resources, and
deploying the at least one second task to one or more of the first media processing entities in response to receiving an indication that the at least one first task has been deployed successfully.

2. The method of claim 1, wherein
the connection map includes a flow control parameter indicating whether a respective pair of tasks among the first plurality of tasks must be included in a same slicing window; and
the distributing distributes the respective pair of tasks based on the flow control parameter.

3. The method of claim 2, wherein the flow control parameter is a breakable parameter.

4. The method of claim 3, wherein the flow control parameter for the respective pair of tasks further includes a shareable parameter indicating whether the respective pair of tasks must be deployed at a same media processing entity.

5. The method of claim 1, wherein
the workflow description includes an execution mode parameter indicating an execution mode for processing the first plurality of tasks.

6. The method of claim 5, wherein the execution mode is one of a streaming execution mode and a stepping execution mode.

7. The method of claim 1, wherein the provisioning further comprises:
scheduling the at least one first task and the at least one second task for deployment to one or more of the first media processing entities prior to deploying the at least one first task and prior to deploying the at least one second task.

8. The method of claim 1, wherein the first plurality of tasks form a workflow including at least two connected tasks.

9. The method of claim 1, further comprising:
distributing a second plurality of tasks for processing second media content among at least the first slicing window and the second slicing window, the first slicing window including at least one third task from among the second plurality of tasks and the second slicing window including at least one fourth task from among the second plurality of tasks; and
provisioning the second media content to at least a second of the one or more media sinks by
deploying the at least one third task to one or more second media processing entities, and
deploying the at least one fourth task to one or more of the second media processing entities in response to receiving the indication that the at least one first task has been deployed successfully.

10. The method of claim 9, wherein
the first plurality of tasks form a first workflow;
the second plurality of tasks form a second workflow; and
the first workflow and the second workflow are executed collaboratively and synchronized according to the first slicing window and the second slicing window.

11. The method of claim 1, wherein the deploying the at least one second task to one or more of the first media processing entities comprises:
deploying the at least one second task to the one or more of the first media processing entities in response to receiving the indication that all tasks included in the first slicing window have been deployed and executed successfully.

12. The method of claim 1, wherein
the workflow description describes information enabling a corresponding workflow, and
the connection map describes connection edges of a directed acyclic graph (DAG) representation of the corresponding workflow.

13. A network apparatus comprising:
at least one processor; and
at least one memory including computer program code, the at least one memory and the computer program code configured to, with the at least one processor, cause the network apparatus to
distribute first plurality of tasks for processing first media content among at least a first slicing window and a second slicing window based on a connection map included in a workflow description from a network based media processing (NBMP) source, the first slicing window including at least one first task from among the first plurality of tasks and the second slicing window including at least one second task from among the first plurality of tasks;
calculate resources needed for the first slicing window; and
provision the first media content to at least a first of one or more media sinks by
deploying the at least one first task to one or more first media processing entities based on the calculated resources, and
deploying the at least one second task to one or more of the first media processing entities in response to receiving an indication that the at least one first task has been deployed successfully.

14. The network apparatus of claim 13, wherein
the connection map includes a flow control parameter indicating whether a respective pair of tasks among the first plurality of tasks must be included in a same slicing window; and
the at least one memory and the computer program code are configured to, with the at least one processor, cause the network apparatus to distribute the respective pair of tasks based on the flow control parameter.

15. The network apparatus of claim 14, wherein the flow control parameter is a breakable parameter.

16. The network apparatus of claim 15, wherein the flow control parameter for the respective pair of tasks further includes a shareable parameter indicating whether the respective pair of tasks must be deployed at a same media processing entity.

17. The network apparatus of claim 13, wherein
the workflow description includes an execution mode parameter indicating an execution mode for processing the first plurality of tasks.

18. The network apparatus of claim 17, wherein the execution mode is one of a streaming execution mode and a stepping execution mode.

19. The network apparatus of claim 13, wherein the at least one memory and the computer program code are configured to, with the at least one processor, cause the network apparatus to
schedule the at least one first task and the at least one second task for deployment to one or more of the first media processing entities prior to deploying the at least one first task and prior to deploying the at least one second task.

20. The network apparatus of claim 13, wherein the at least one memory and the computer program code are configured to, with the at least one processor, cause the network apparatus to
distribute a second plurality of tasks for processing second media content among at least the first slicing window and the second slicing window, the first slicing window including at least one third task from among the second plurality of tasks and the second slicing window including at least one fourth task from among the second plurality of tasks; and provision the second media content to at least a second of the one or more media sinks by deploying the at least one third task to one or more second media processing entities, and deploying the at least one fourth task to one or more of the second media processing entities in response to receiving the indication that the at least one first task has been deployed successfully.

21. The network apparatus of claim 20, wherein the first plurality of tasks form a first workflow;

the second plurality of tasks form a second workflow; and the first workflow and the second workflow are executed collaboratively and synchronized according to the first slicing window and the second slicing window.

22. A non-transitory computer-readable medium storing computer-executable instructions that, when executed by at least one processor at network apparatus, cause the network apparatus to perform a method for provisioning media content to one or more media sinks, the method comprising:

distributing a first plurality of tasks for processing first media content among at least a first slicing window and a second slicing window based on a connection map included in a workflow description from a network based media processing (NBMP) source, the first slicing window including at least one first task from among the first plurality of tasks and the second slicing window including at least one second task from among the first plurality of tasks;

calculating resources needed for the first slicing window; and provisioning the first media content to at least a first of the one or more media sinks by deploying the at least one first task to one or more first media processing entities based on the calculated resources, and deploying the at least one second task to one or more of the first media processing entities in response to receiving an indication that the at least one first task has been deployed successfully.

* * * * *